US011102650B2

(12) United States Patent
Benoliel et al.

(10) Patent No.: US 11,102,650 B2
(45) Date of Patent: Aug. 24, 2021

(54) SECURE BEACON IDENTITY

(71) Applicant: Noodle Technology, Inc., San Francisco, CA (US)

(72) Inventors: Micha Anthenor Benoliel, San Francisco, CA (US); Kyude Karyan, San Jose, CA (US)

(73) Assignee: Noodle Technology Inc., San Francisco, CA (US)

( * ) Notice: Subject to any disclaimer, the term of this patent is extended or adjusted under 35 U.S.C. 154(b) by 118 days.

(21) Appl. No.: 16/412,200

(22) Filed: May 14, 2019

(65) Prior Publication Data

US 2019/0357040 A1    Nov. 21, 2019

Related U.S. Application Data

(60) Provisional application No. 62/671,922, filed on May 15, 2018.

(51) Int. Cl.
| | | |
|---|---|---|
| *H04W 12/04* | (2021.01) | |
| *H04W 40/24* | (2009.01) | |
| *H04W 12/00* | (2021.01) | |
| *H04L 9/06* | (2006.01) | |
| *H04L 29/12* | (2006.01) | |
| *H04L 7/00* | (2006.01) | |
| *H04W 56/00* | (2009.01) | |
| *H04W 12/0433* | (2021.01) | |
| *H04W 12/71* | (2021.01) | |

(52) U.S. Cl.
CPC ....... *H04W 12/0433* (2021.01); *H04L 7/0037* (2013.01); *H04L 9/0643* (2013.01); *H04L 61/6022* (2013.01); *H04W 12/71* (2021.01); *H04W 40/244* (2013.01); *H04W 56/003* (2013.01)

(58) Field of Classification Search
CPC ........ H04W 12/04033; H04W 40/244; H04W 12/00512; H04W 56/003; H04L 61/6022; H04L 7/0037; H04L 9/0643
See application file for complete search history.

(56) References Cited

U.S. PATENT DOCUMENTS 10,219,106 B1 *   2/2019  Lam ........................ H04W 4/80
10,587,414 B2 *   3/2020  Reed ..................... H04L 9/3236
(Continued)

OTHER PUBLICATIONS

"How Useful is NIST's Randomness Beacon for Cryptographic Use"—Mashable.com, Princeton University, Mar. 25, 2014 https://crypto.stackexchange.com/questions/15225/how-useful-is-nists-randomness-beacon-for-cryptographic-use (Year: 2014).*

(Continued)

*Primary Examiner* — Randy A Scott
(74) *Attorney, Agent, or Firm* — Maschoff Brennan

(57) ABSTRACT

A method may include receiving a beacon from a first intermediate device via a first network, the beacon being received by the first intermediate device from an endpoint device via a second network. The beacon may include a hash value based at least in part on the identity of the endpoint device and a time unit when the beacon was generated. The hash value of the beacon may be validated based on the identity of the endpoint device and the time unit when the beacon was generated. The beacon may be forwarded to a server via a third network in response to the hash value of the beacon being valid.

19 Claims, 7 Drawing Sheets

(56) References Cited

U.S. PATENT DOCUMENTS

2016/0353245 A1* 12/2016 Kulikov ................ G06Q 30/02
2019/0246351 A1* 8/2019 Yang ................ H04W 52/0216

OTHER PUBLICATIONS

"Secure Verification of Location Claims with Simultaneous Distance Modification"—Wang et al, The University of Texas at Austin, Apr. 2007 https://www.cs.cornell.edu/~shmat/shmat_asian07.pdf (Year: 2007).*

* cited by examiner

SECURE BEACON IDENTITY

CROSS-REFERENCE TO RELATED APPLICATIONS

This application claims priority to U.S. Provisional Application No. 62/671,922, filed May 15, 2018, titled SECURE BEACON IDENTITY, which is incorporated herein by reference in its entirety.

BACKGROUND

The present disclosure generally relates to security and privacy for communication between networked "smart" devices.

The Internet of things (IoT) is the concept of connecting ordinary devices like lights and doors to a computer network to make them "intelligent." An embedded system or a computer connects each device together in a network and to the internet. The connections allow each device to collect and exchange data, and permits them to be controlled remotely or permits them to remain updated, or be controlled remotely or by setting rules or chains of actions.

The use of IoT devices is expanding into many aspects of human life, and experts estimate that the IoT will have almost 50 billion devices by 2020. Increasingly, IoT devices are being used for healthcare at hospitals, and in medical device and pharmaceutical manufacturing. In cities, IoT devices help track and monitor pollution. IoT devices can also be used by governments, militaries, companies, and individuals for asset tracking and management. Although these applications serve different purposes, many of them require strong security and privacy controls.

Security and privacy concerns have long plagued the Internet. Increased mobile device usage has increased these security and privacy concerns, and the advent IoT devices has heightened security and privacy concerns even further. In the past, the general public has been largely unaware of the risks, but this may be changing as IoT security is starting to gain media attention.

The claimed subject matter is not limited to embodiments that solve any disadvantages or that operate only in environments such as those described above. This background is only provided to illustrate examples of where the present disclosure may be utilized.

SUMMARY

The present disclosure generally relates to security and privacy for communications between networked devices.

In one non-limiting example, a method may include receiving a beacon from a first intermediate device via a first network. The beacon may be received by the first intermediate device from an endpoint device via a second network. The beacon may include a hash value based at least in part on the identity of the endpoint device and a time unit when the beacon was generated. The method may include validating the hash value of the beacon based on the identity of the endpoint device and the time unit when the beacon was generated. The method may further include forwarding the beacon to a server via a third network in response to the hash value of the beacon being valid.

In some aspects, validating the hash value of the beacon further may include precomputing hash values for all unique device identities and for all values of time units up to a fixed time value, storing the precomputed hash values, comparing the hash value received with the beacon with the stored precomputed hash values, and validating the hash value of the beacon in response to the hash value received with the beacon matching one of the stored precomputed hash values. In other aspects, the stored precomputed hash values may be sorted according to hash values.

In another example, a method may include calculating hash values for all unique device identities and for all values of time units up to a fixed time value, storing the precomputed hash values, receiving a beacon from a first intermediate device via a first network, comparing the hash value received with the beacon with the stored precomputed hash values, validating the hash value of the beacon in response to the hash value received with the beacon matching one of the stored precomputed hash values as a result of the identity of the endpoint device and the time unit when the beacon was generated, and forwarding the beacon to a server via a third network in response to the hash value of the beacon being valid. In some aspects, the beacon may be received by the first intermediate device from an endpoint device via a second network. The beacon may include a hash value based at least in part on the identity of the endpoint device and a time unit when the beacon was generated.

In yet another example, a method may include receiving a beacon from a first intermediate device via a first network, calculating a clock drift of the endpoint device, adjusting the time unit of the based on the calculated clock drift, validating the hash value of the beacon based on the identity of the endpoint device and the time unit when the beacon was generated, and forwarding the beacon to a server via a third network in response to the hash value of the beacon being valid. In some aspects, the beacon may be received by the first intermediate device from an endpoint device via a second network. The beacon may include a hash value based at least in part on the identity of the endpoint device and a time unit when the beacon was generated.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1:
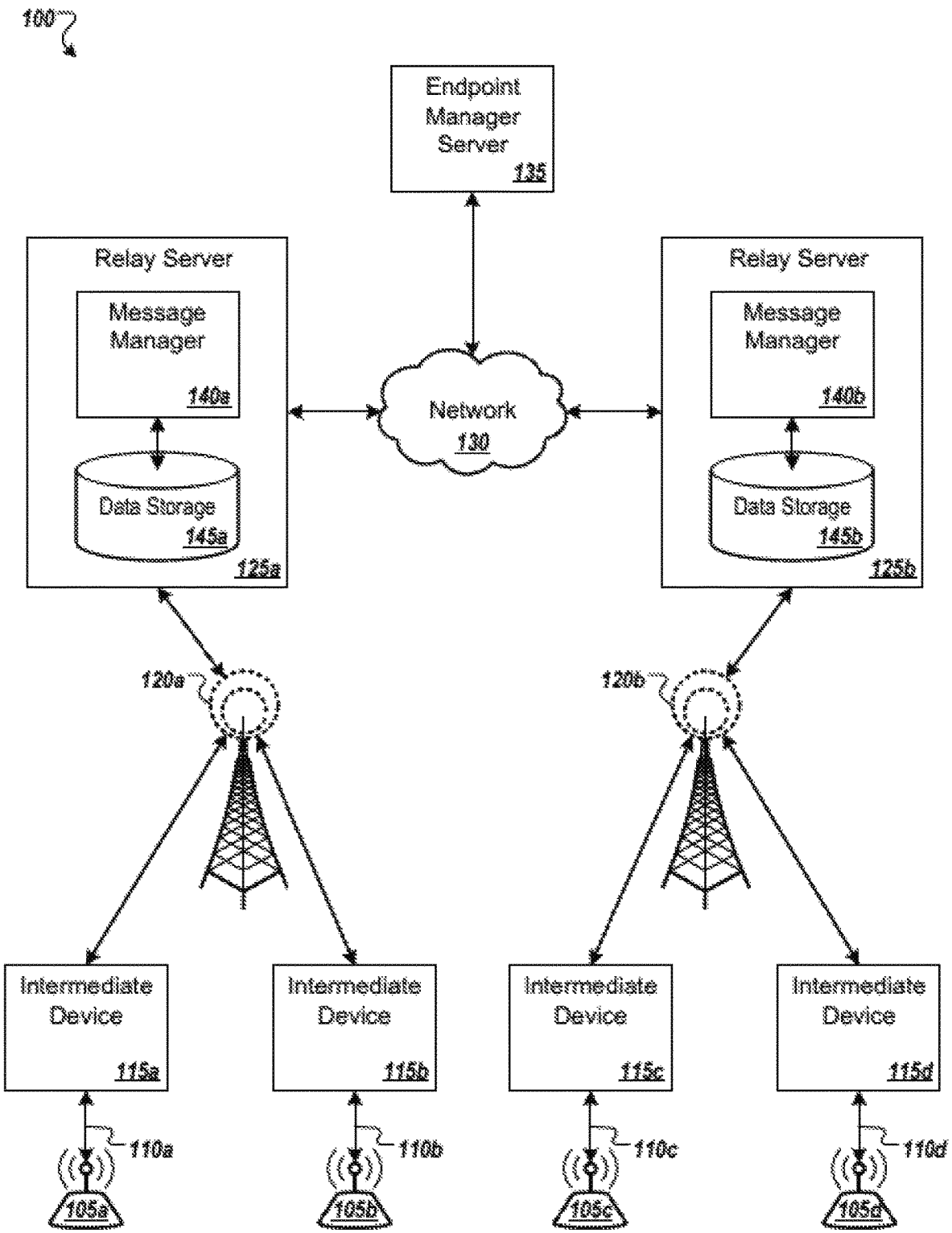
FIG. 1 illustrates an example network architecture.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

As the number of Internet of Things (IoT) devices increases, security and privacy concerns associated with these devices also increases, especially as IoT devices expand into more and more aspects of human life.

IoT devices may periodically emit "beacons," which are signals that include identifying information about the device and its purpose. In some circumstances, it may be possible to correlate individuals with their devices based on these beacons. This includes not only phones and tablets, but also auxiliary devices such as asset trackers, health monitoring devices, car keys, wireless watches, etc.

However, such beacons from IoT devices may lead to security concerns. By collecting beacon data, a wrongdoer may be able to infer or deduce which individuals own which devices, as well as the physical location of individuals, simply by tracking with which devices they spend significant time in close proximity. This may be an effective strategy for wrongdoers because individuals often carry devices with them for significant periods of time on a daily basis. Once a wrongdoer has determined who owns which devices, that information may be used to impersonate the device and track the device and its owner. In one example, if a wrongdoer is positioned next to someone, the wrongdoer may use a tracker (for example, in their backpack), to intercept and analyze a beacon from a device that the user is carrying. In this way, the beacon from the device can leak an identity of the user.

Some IoT device tracking methods include using a crowd global positioning system (GPS) to locate assets a user wants to track, such as a set of keys. The assets may transmit beacons that may be sent or relayed to device manufacturers. For example, phones may periodically scan for asset beacons. These phones transfer the beacons to the manufacturers' servers. The device manufacturers may then use the beacon data to identify the physical location of the tracked asset in case the user loses it. Unfortunately, a wrongdoer may also read this beacon data and use it to impersonate the device, such as by programming another device to emit this same beacon from a different location.

IoT devices and the beacons they emit may also lead to privacy concerns. Some companies, including major corporations, are introducing tracking technology that pose privacy issues. For example, companies that build routers may automatically track every device that comes sufficiently close to the router, including IoT devices.

An asset tracking device may emit a beacon that includes a unique, unchanging, device ID. This enables device tracking, but also exposes a vulnerability. The emitting device and nearby devices may see the beacon. For example, if a user carries their beacon-emitting keys everywhere, others can sniff the beacon emitted by the keys and use the beacon to determine that the keys belong to the user.

Aspects of the present disclosure address these and other shortcomings of conventional systems by providing systems and methods to remove wireless signatures altogether and anonymize the identity of trackers and sensors. This may alleviate or eliminate the security and privacy concerns associated with IoT devices. Additionally or alternatively, wireless signals, such as Bluetooth wireless signals, mat instead be used for anonymous location tracking on devices.

Aspects of the present disclosure further reduces the ability of wrongdoers to track an individual based on beacon contents. In particular, the present disclosure describes systems to make devices anonymous to third parties. Such systems may be useful for tracking device manufacturers to protect the privacy and security of their users. Furthermore, the present disclosure describes methods to create secure non-forgeable beacons that a malicious bystander cannot use to impersonate a device.

Asset tracking beacons may advertise a unique ID so that these beacons can be recognized by other devices. This unique ID may include the device MAC address, or some custom ID, or a combination of both.

The Bluetooth wireless technology standard for exchanging data between devices includes protocols to randomize MAC addresses to make it more difficult for third parties to identify devices. This may prevent not only malicious actors from identifying a beacon but also legitimate third parties trying to locate a lost device.

To address these and other shortcomings of prior approaches, any device, such as a client or user device, may receive anonymized beacons from emitting devices. These anonymized beacons may be received by any computational device that includes software described herein installed on the device or embedded in one of its applications. Such devices may be ubiquitous enough to effectively provide wide coverage. The client or user device may send the anonymized beacon to a server. The server may include logic and data that may be used by the server to identify the source of the anonymized beacon. In this manner, the identity of the emitting device may be hidden from unauthorized devices or sniffers.

FIG. 1 illustrates an example network architecture 100 in which embodiments of the present disclosure may be implemented. The network architecture 100 may include one or more endpoint devices 105, one or more intermediate devices 115, one or more relay servers 125, and one or more endpoint manager servers 135. In some embodiments, the network architecture 100 may be capable to move data between one or more endpoint devices 105 and various endpoint manager servers 135 by way of crowd-sourced intermediate devices 115, which may function act as network clients, and one or more relay servers 125.

An endpoint device 105 may include one or more IoT devices. The endpoint device 105 may include a power supply, a data collection device (e.g., a sensor), and a network device. The power supply may include a battery or a connection to a power grid. Additionally or alternatively, the power supply may include an energy harvesting apparatus, such as a solar panel, solar cell, solar photovoltaic, electromagnetic, etc. In at least some embodiments, the endpoint device 105 may not include a power supply and may instead use ambient backscatter techniques. The endpoint device 105 may also include one or more sensors. The one or more sensors may be configured to detect any type of condition, and generate electronic data based on a detected condition. For example, the endpoint device 105 may include a smart watch with a heart rate monitor that is configured to generate heart rate data using heart rate conditions collected by the heart rate monitor. In some embodiments, the endpoint device 105 does not have capability to communicate over the Internet and only includes hardware and/or software capable of communicating with nearby devices, such as a nearby intermediate device 115. In other embodiments, the endpoint device 105 may include hardware and/or software communicate over the Internet.

The network device of the endpoint device 105 may include any hardware, software, or combination thereof that is capable to communicate with another device via a network. In at least one embodiment, the network device may include any network controller configured to communicate via a short-range network, such as Bluetooth® or any other short-range network. In at least one embodiment, the network device may include any network controller configured to communicate via a low-power network. Example endpoint devices 105 include, but are not limited to, industrial devices, residential appliances, commercial equipment, inventory trackers, smart watches, wearables, heart rate monitors, logistics trackers, environmental sensors, cash registers, credit card readers, point-of-sale (POS), bikes, electric scooters, electric skate boards, cars, electric cars, satellites, or any device (mobile and not mobile that includes a wireless radio interface. The network architecture 100 may include any number of endpoint devices 105 and the endpoint devices 105 in the network architecture 100 may be any type of endpoint device 105, including any type of network-capable device. The endpoint devices 105 may be fixed or relatively stationary in the network architecture 100, such as a POS or a pollution sensor. Additionally or alternatively, the endpoint devices 105 may be mobile, such as a smart watch, or any car or vehicle.

The one or more endpoint devices 105 may be configured to communicate with other devices via at least one wireless network 110. For example, a first endpoint device 105a may be in electronic communication with a first intermediate device 115a via a wireless network 110a. The one or more intermediate devices 115 may include any type of device capable of communicating with an endpoint device 105 via the wireless network 110 and with a relay server 125 via a second network 120. In at least one embodiment, an intermediate device 115 may include two network controllers—a first network controller to communicate via the wireless network 110 and a second network controller to communicate via the second network 120. Example intermediate devices 115 include mobile devices, personal computers (PC), laptops, smart phones, netbooks, e-readers, personal digital assistants (PDA), cellular phones, mobile phones, tablets, vehicles, drones, cars, trucks, wearable devices, routers, televisions, or set top boxes, etc.

As illustrated, the first endpoint device 105a may be in electronic communication with the first intermediate device 115a via the wireless network 110a (e.g., a short-range network). Further, a second endpoint device 105b may be in electronic communication with a second intermediate device 115b via another wireless network 110b (e.g., a low-power network). A third endpoint device 105c may be in electronic communication with a third intermediate device 115c via another wireless network 110c. A fourth endpoint device 105d may be in electronic communication with a fourth intermediate device 115d via another wireless network 110d.

In some embodiments, the wireless network 110 may be any network that uses a relatively low amount of power. Example wireless networks 110 may include any Bluetooth® network type (e.g., Bluetooth Low Energy (BLE), Bluetooth 4.0, Bluetooth 5.0, Bluetooth Long Range), NB-IoT, LTE Direct, LTE-M, LTE M2M, 5G, Wi-Fi, Wi-Fi Aware or any low-power network. The one or more endpoint devices 105 may connect to various intermediate devices 115 using different types of wireless networks 110. For example, the first endpoint device 105a may be in electronic communication with the first intermediate device 115a via a first short-range wireless network 110a and the second endpoint device 105b may be in electronic communication with the second intermediate device 115b via a second short-range wireless network 110b.

Endpoint devices 105, intermediate devices 115, or both, may be fixed, relatively stationary or moveable. When an endpoint device 105 and an intermediate device 115 come into wireless range of each other, the endpoint device 105 and the intermediate device 115 may perform a handshake and/or authentication to initiate data exchange between the endpoint device 105 and the intermediate device 115.

In some embodiments, the endpoint device 105 may periodically send beacons that include data via the wireless network 110. The endpoint devices 105 may include various services that may run on the endpoint devices 105. For example, a smart watch may include a clock service, a heart rate monitor service, a motion detection service, a music service, etc. Beacons may be generated for each of these services or a single beacon may be generated to include data for some or all of the services.

An intermediate device 115 may listen for such beacons from endpoint devices. Responsive to receiving a beacon, the intermediate device 115 may send the beacon to a relay server 125 via a second network 120. In at least one embodiment, the wireless network 110 and the second network 120 are different types of networks. For example, the wireless network 110 may be a Bluetooth® network and the second network 120 may be a cellular network, Wi-Fi, or the Internet.

The second network 120 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof.

The relay server 125 may send the beacon, or information related to the beacon, to an endpoint manager server 135 via a third network 130. The third network 130 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof. In at least one embodiment, the second network 120 and the third network 130 are the same network or include at least some overlapping components.

The one or more relay servers 125 may include one or more computing devices, such as a rackmount server, a router computer, a server computer, a personal computer, a mainframe computer, a laptop computer, a tablet computer, a desktop computer, smartphone, cars, drones, a robot, any mobility device that has an operating system, etc.), data stores (e.g., hard disks, memories, databases), networks, software components, and/or hardware components. The one or more relay servers 125 may be configured to receive a beacon from an intermediate device 115. The one or more relay servers 125 may send the beacon, or data related to or associated with to an endpoint manager server 135. The one or more relay servers 125 may receive a message from the endpoint manager server 135 and, in some embodiments, may send the message from the endpoint manager server 135 to an intermediate device 115. In at least some embodiments, the intermediate device 115 may perform one or more operations responsive to receiving the message from the endpoint manager server 135. The operations include operations local to the intermediate device 115, and/or sending the message from the endpoint manager server 135 to an endpoint device 105.

The endpoint manager server 135 may include one or more computing devices, such as a rackmount server, a router computer, a server computer, a personal computer, a mainframe computer, a laptop computer, a tablet computer, a desktop computer, a smartphone, a car, a drone, a robot, any mobility device that has an operating system etc.), data stores (e.g., hard disks, memories, databases), networks, software components, and/or hardware components. The endpoint manager server 135 may be associated with one or more endpoint devices 105. For example, a particular corporation, person, or manufacturer may sell an endpoint device 105 and may use an endpoint manager server 135 to communicate with and/or control the endpoint device 105.

The endpoint manager server 135 may send messages associated with a particular endpoint device 105, or a set of endpoint devices 105. For example, the endpoint manager server 135 may send updates (e.g., firmware, software) to the particular endpoint device 105, or the set of endpoint devices 105. The endpoint manager server 135 may send other communications to an endpoint device 105, such as a response to a request from a beacon generated by the particular endpoint device 105.

Each relay server 125 may include a message manager 140. The message manager 140 may be implemented using hardware including a processor, a microprocessor (e.g., to perform or control performance of one or more operations), an FPGA, or an ASIC. In some other instances, the message manager 140 may be implemented using a combination of hardware and software. Implementation in software may include rapid activation and deactivation of one or more transistors or transistor elements such as may be included in the hardware of a computing system (e.g., the relay server 135). Additionally, software defined instructions may operate on information within transistor elements. Implementation of software instructions may at least temporarily reconfigure electronic pathways and transform computing hardware.

Each relay server 125 may include a data storage 145. The data storage 145 may include any memory or data storage. In some embodiments, the data storage 145 may include computer-readable storage media for carrying or having computer-executable instructions or data structures stored thereon. The computer-readable storage media may include any available media that may be accessed by a general-purpose or special-purpose computer, such as a processor. For example, the data storage 145 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 145. In the depicted embodiment, the data storage 145 is part of the relay server 125. In some embodiments, the data storage 145 may be separate from the relay server 125 and may access the data storage 145 via a network. In at least one embodiment, the data storage 145 may include multiple data storages.

The data storage 145 may include data pertaining to the endpoint devices 105, intermediate devices 115, and endpoint manager servers 135 and relationships between the endpoint devices 105, intermediate devices 115, and endpoint manager servers 135. For example, the data storage 145 may include a table or list of endpoint devices that are associated with a particular endpoint manager server 135. The data storage 145 may include data pertaining to beacons received from endpoint devices, such as a timestamp of the receipt of the beacon, a timestamp associated with the creation of the beacon, a geo-location associated with the beacon and/or the endpoint device 105 that created or transmitted the beacon, sensor data associated with the endpoint device, routing information for how and/or where to send data between endpoint manager servers 135 and endpoint devices 105, connection strengths between intermediate devices and endpoint devices, proximity of an endpoint device 105 to an intermediate device 115, type of wireless network 110 that connects an intermediate device 115 and an endpoint device 105, a cost of a connection between an intermediate device 115 and an endpoint device 105, a current battery level of the intermediate device, a type of intermediate device, etc.

The message manager 140 may process communications between the endpoint devices 105, the intermediate devices 115 and the endpoint manager server(s) 135. In an example, the message manager 140 may receive a beacon from the intermediate device 115a via the second network 120a. The beacon may have been sent to the intermediate device via the wireless network 110a by endpoint device 105a. A beacon may contain characteristics about the endpoint device 105, including an identifier of the endpoint device 105 (e.g., a MAC address, a unique ID), a geographical location of the endpoint device 105a, and advertisements of the UUIDs of the services it supports, etc. The message manager 140 may identify the characteristics of the beacon, such as by analyzing the beacon to identify information pertaining to the beacon. The message manager 140 may access the data storage 145 to identify, based on the characteristics of the beacon, an endpoint manager server 135 that is associated with the beacon. For example, the identifier of the endpoint device may be associated with a particular manufacturer that operations a particular endpoint manager server 135. The message manager 140 may identify this particular endpoint manager server 135 in the data storage 145 and an address and/or path to send the beacon in order to reach the endpoint manager server 135. In at least some embodiments, the message manager 140 may send the beacon, or a beacon message to the endpoint manager server 135 via the third network 130. The beacon message may include the beacon, may not include the beacon, or may include information pertaining to the beacon.

In at least one embodiment, a beacon may include data from multiple services associated with the endpoint device 105. Additionally or alternatively, multiple beacons from a single endpoint device 105 may be generated and broadcast via the wireless network 110. Each of these multiple beacons, for example, may be associated with a different service associated with the endpoint device 105. The message manager 140 may identify the services, and based on information for the service, identify an appropriate endpoint manager server 135 that should receive a beacon message.

The endpoint manager server 135 may receive the message from the relay server 125. The endpoint manager server 135 may store the message, process the message, generate a report based on the message, may generate a notification or response based on the message, or any other action. For example, endpoint manager server 135 may generate a response message pertaining to the beacon message. The response message may include a message intended for one or more of the relay server 125, an intermediate device 115, the endpoint device 105 that generated the beacon, or another endpoint device 105 that did not generate the beacon. The endpoint manager server 135 may send the response message to the same relay server 125 that sent the beacon message to the endpoint manager server 135 (e.g., the relay server 125a), or to a different relay server 125 that did not send the beacon message to the endpoint manager server 135 (e.g., relay server 125b).

The relay server 125 may receive, from the endpoint manager server 135, the response message pertaining to the beacon message. The relay server 125 may process the response message, such as by performing operations at the relay server 125, sending data to another device (e.g., a user device), sending data to an endpoint device 105, etc.

The network architecture 100 may be used to exchange data between any devices capable of network-based communication in a manner that is different than conventional communication over the Internet.

In an example, the network architecture 100 may leverage existing smartphone infrastructure to create delay-tolerant connectivity. The network architecture 100 can move data to the cloud in an initially delay tolerant fashion, which may be useful for many types of IoT communications such as firmware updates, status updates, log-file storage, and micropayments. The intermediate device may include software that runs on smartphones to periodically scan for other devices (e.g., the endpoint devices 105) like industrial devices, smartwatches, wearables, logistics trackers, and environmental sensors. These endpoint devices 105 may connect with the software client running on the smartphones to create massive, area wide networks for moving data to and within the cloud.

Further, it has been estimated that 95% of the human population is covered by some sort of cellular service. The network architecture 100 can be deployed anywhere in the world and enables regions of lower connectivity to increase their connectivity. Moreover, the network architecture 100 can provide coverage beyond the reach of conventional cellular networks by using software that runs on Bluetooth®-enabled smartphones, for example. Users may travel to areas of limited or no cellular connectivity, but still may receive beacons from endpoint devices 105 via the wireless network 110. Using the network architecture 100, telco operators, for example, can now easily deploy a software update to their user devices to begin communicating with endpoint devices 105 as described herein to provide higher latency IoT connectivity to even the remotest regions of the world.

In a specific example, the network architecture 100 can be used for asset tracking and management. For example, the network architecture 100 can be used to find lost items that are configured as an endpoint device 105, such as a skateboard with a wireless radio chipset, an attached tracking beacon, a laptop, etc. A user, for example, may indicate that the item is lost, such as by using a mobile application or website to indicate, to the endpoint manager server 135 or to the relay server 125, that the item is lost. In a first embodiment, the endpoint manager server 135 may send a message to one or more relay servers 125 to watch for the lost item. The relay servers 125 may add an identifier of the lost item to a lost item watch list. As intermediate devices 115 move to different geographic locations, they can receive beacons from different endpoint devices 103. The intermediate devices 115 then forward the beacons to the relay servers 125. When a relay server 125 server receivers a beacon, the relay server 125 can analyze the beacon to determine if the beacon originated at an endpoint device 105 that is on the watch list. When the relay server 125 identifies a beacon that originated at an endpoint device 105 that is on the watch list, the relay server 125 can notify the endpoint manager server 135 that the lost item has been found. In at least some embodiments, the relay server 125 may send the notification that the lost item has been found as a push notification or as a pull notification (i.e., in response to a request from the endpoint manager server 135). In at least some embodiments, the relay server 125 may send the notification that the lost item has been found to the user device that was used by the user to indicate that the item was lost.

As the intermediate devices 115 and/or the endpoint devices 105 move to different geographic locations, the manner they communicate in the network architecture 100 may change. For example, if one of the endpoint devices 105 moves to a location where it is no longer close enough to one of the intermediate devices 115 to be able to communicate with it, then it may continue to send beacons even though there is no device within range to receive the beacons. Furthermore, the endpoint devices 105 may continue to send beacons until one of the intermediate devices 115 is within range. Similarly, the intermediate devices 115 may move to locations out of a range of the endpoint devices 105, and the network architecture 100 may adapt accordingly.

The network architecture 100 may select one of the intermediate devices 115 to communicate and/or forward beacons for a corresponding one of the endpoint devices 105. For example, one of the relay servers 125 may select one of the intermediate devices 115 to handle sending the response message to one of the endpoint devices 105. The relay server 125 may use any selection criteria to select which intermediate device 115 to use to send the response message, such as a connection strength between the intermediate device 115 and the target endpoint device 105, a proximity of an endpoint device 105 to an intermediate device 115, a type of wireless network 110 that connects an intermediate device 115 and an endpoint device 105, a cost of a connection between an intermediate device 115 and an endpoint device 105, a current battery level of the intermediate device, a type of intermediate device, etc.

In some circumstances, two of the intermediate devices 115b may be within range of one of the endpoint devices 105 and both may receive the same beacon from the endpoint device 105. Further, both of the intermediate devices 115 may forward the beacon of the endpoint device 105 to one of the relay servers 125. To reduce redundancy, network traffic, battery impact, etc., the relay server 125 may select one of the intermediate devices 115 and the intermediate devices 115 to handle communication with the endpoint device 105 and instruct the non-selected intermediate device to ignore beacons from the endpoint device 105, to discard beacons from the endpoint device 105, to stop sending beacons from the endpoint device 105, or any other operation that may reduce network congestion, free-up data storage space, free-up processor capabilities, etc.

As more intermediate devices 115 become available for data transport, data transmission frequency for a particular intermediate device 115 may decrease. In the long term, with enhanced density intermediate device 115 and machine learning based protocols, the technology described here may significantly improve battery life for intermediate devices 115, reduce network congestion, improve global connectivity, etc. The relay server 125 may use any selection criteria to select which intermediate device 105 to use to communicate with the endpoint device 105 and which intermediate device 115 to cease communications regarding the endpoint device 105, such as a connection strength between the intermediate device 115 and the target endpoint device 105, a proximity of the endpoint device 105 to the intermediate device 115, a type of wireless network 110 that connects the intermediate device 115 and the endpoint device 105, a cost of a connection between the intermediate device 115 and the endpoint device 105, a current battery level of the intermediate device 115, a type of intermediate device 115, etc.

Modifications, additions, or omissions may be made to the network architecture 100 without departing from the scope of the present disclosure. The present disclosure more generally applies to the network architecture 100 including one or more endpoint devices 105, one or more wireless networks, one or more intermediate devices 115, one or more second networks 120, one or more relay servers 125, one or more third networks 130, and one or more endpoint manager servers 135 or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 2:
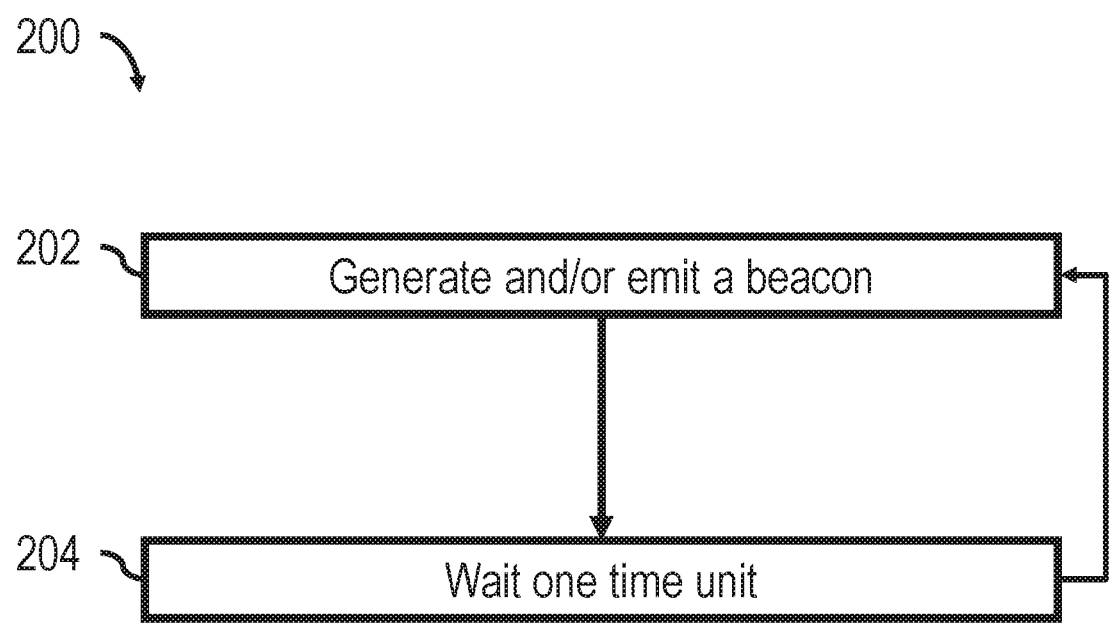
FIG. 2 illustrates a flow diagram of an example method to handle communications between devices.
Figure 3:
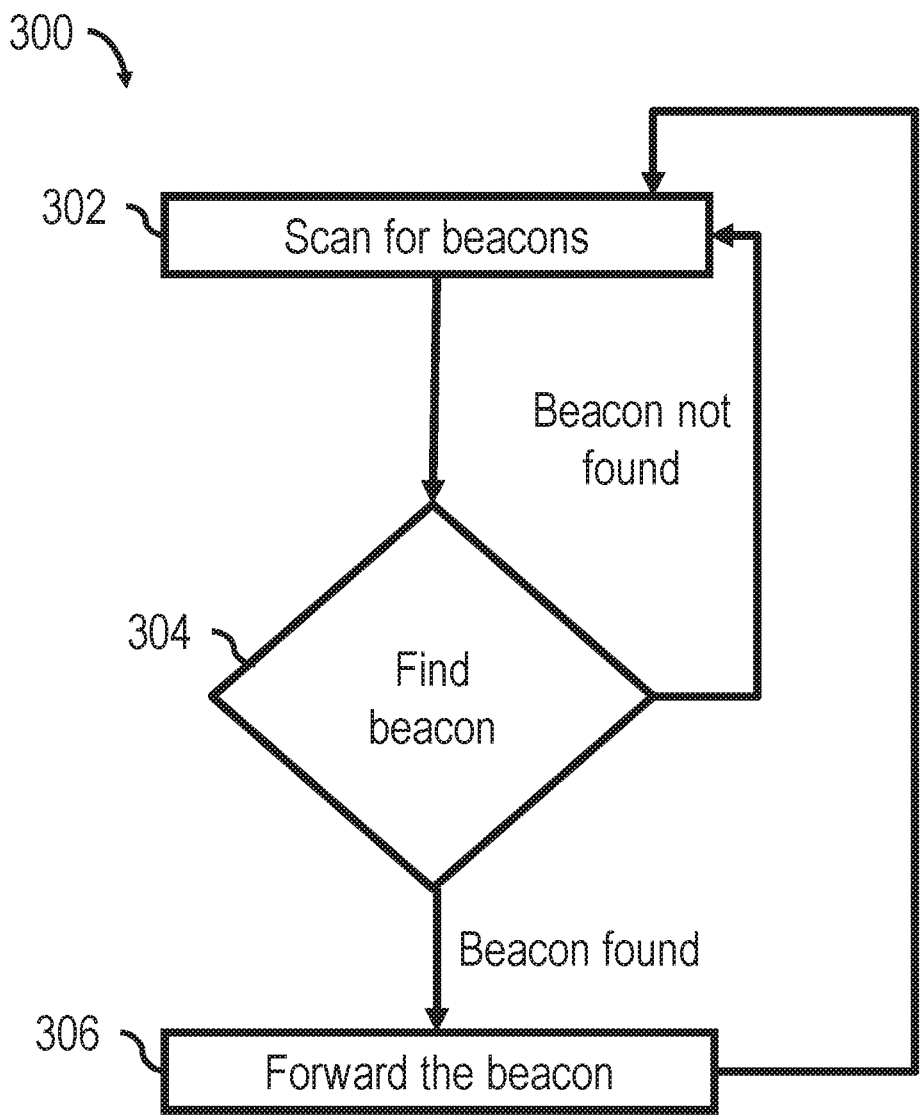
FIG. 3 illustrates a flow diagram of an example method to handle communications between an endpoint device and other devices.
Figure 4:
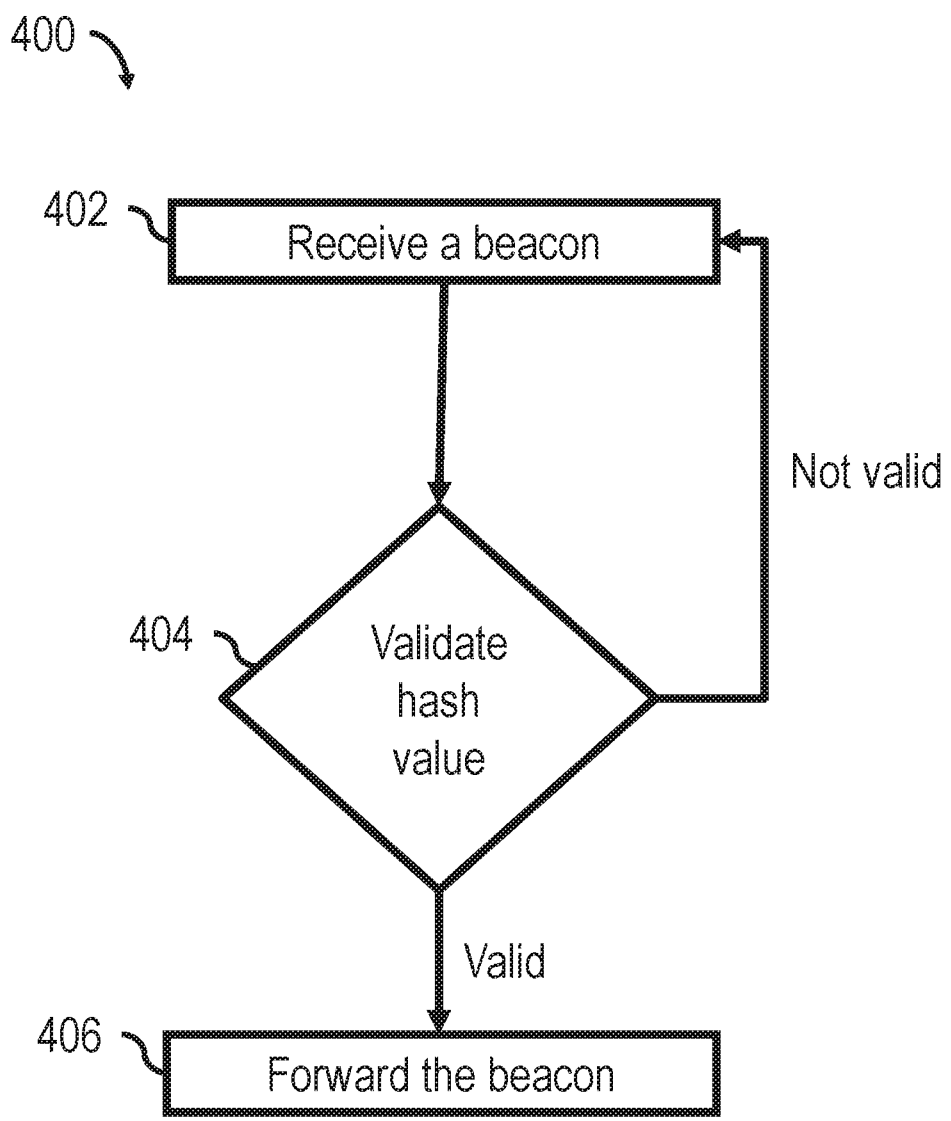
FIG. 4 illustrates a flow diagram of an example method to handle communications between an endpoint device and other devices

FIGS. 2-4 illustrate flow diagrams of example methods related to decentralized networking. The methods described may be used to thwart malicious third parties from recognizing beacons that devices emit. The method may be implemented to protect the security and privacy of devices, and the users associated with such devices.

The methods may be performed by processing logic that may include hardware (circuitry, dedicated logic, etc.), software (such as is run on a general purpose computer system or a dedicated machine), or a combination of both, which processing logic may be included in the endpoint devices 105, intermediate device 115 and/or the relay server 125 of FIG. 1, or another computer system or device. However, another system, or combination of systems, may be used to perform the methods.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As explained above, the endpoint devices 105 may emit a beacon which may include signals having identifying information about the device and its purpose. In some embodiments, the endpoint devices 105 may perform a method to emit a beacon to transmit identifying information about the device and its purpose. However, the beacon may be emitted in a manner to preserve security and privacy, as described herein.

FIG. 2 illustrates a flow diagram of an example method 200 to handle communications between devices. For example, the example method 200 may be performed by at least one of the endpoint devices 105 of FIG. 1 to transmit identifying information about the device and its purpose in a manner to preserve security and privacy. The method 200 may begin at block 202, wherein the device may generate and/or emit a beacon. The beacon may include a hash value, which may be based on various characteristics and/or factors. In at least one embodiment, the method my periodically generate and/or emit the beacon.

The device may include a device ID to identify the device. The device ID may be combined with one or more of a secret key, a shared secret, and a time stamp. The advertised or transmitted beacon may change, for example, based on a hash function (e.g., a one-way hash function). The hash function may depend on the specified device ID and, in some embodiments, also on the secret key and/or the shared secret and/or a time. In some aspects, the time may be the current time or the time that the beacon was transmitted, although other time stamps may be implemented.

In particular, the hash value may be based on an assigned time unit (TU). The time unit may be a relatively short constant duration, for example, 5 minutes. The time unit may be agreed upon prior to beacon generation and/or transmission, for example, either during the manufacturing of the device or when the device is initially provisioned. The time unit may be a value known to the devices involved in beacon generation and/or reception. A timestamp may be expressed as an integral number of time units that have elapsed since an agreed or predetermined start time. When the devices are either manufactured or initially provisioned, the device clock can be synchronized with the server clock. In some embodiments, the initialization vector and the device ID are not combined or may be combined at a different point in the process.

In some embodiments, the hash value may be calculated according to the following algorithm: hash(device ID, Key, time in TU).

In at least some embodiments, the method may also optionally use a longer identifier by combining a device ID such as a MAC address with a secret key. The secret key may include an auxiliary identifier that may be combined with the time stamp and sent to either a proprietary server or a device manufacturer's server. The function that was used to create the beacon may be known to either server, so that when the beacon arrives at either server, it is possible to recover the plaintext of the beacon despite the fact that the function is a hash function.

As mentioned above, a time unit may be assigned to the device either during manufacturing or when the device is initially provisioned. At block 204, the device may wait one time unit. After waiting for one time unit at block 204, the method 200 may return to block 202, wherein the device may generate and/or emit a beacon. The device may continue to generate and/or emit a beacon according to block 202 and waiting a predetermined amount of time (e.g., one time unit) according to block 204. Thus, the device may continue to periodically generate and/or emit a beacon which includes, for example, the device ID, the secret key, and/or time stamp which may all be anonymized by the hash function.

In some circumstances, devices may have an internal clock that tracks the time relative to a reference clock or other devices. This internal clock may drift and desynchronize, especially as time passes. In circumstances where the hash function uses a time (e.g., a time unit) to generate a hash value, clock drift may affect the hash function so it may not be successfully read or decrypted by target devices. To avoid issues with clock desynchronization, the duration or length of the time unit may be increased. However, this may decrease the level of privacy or security because the length of time that the hash function stays the same also increases. Accordingly, in circumstances where increased security or privacy is desired, the time unit duration may be decreased. However, if robustness to clock drift is desired, the time unit duration may be increased. In circumstances where the clocks of multiple devices are re-synchronized often, or are very accurate (e.g., atomic clocks), then clock drift may not be a concern and the time unit duration may be decreased. In at least some embodiments, any number of hash values may be precomputed. Additionally or alternatively, time re-synchronization commands may be issued to address any clock drift that may occur.

As explained above, the endpoint devices may emit a beacon in a manner to preserve security and privacy, as described herein. Those beacons may be received by intermediate devices, such as the intermediate devices 115 of FIG. 1.

FIG. 3 illustrates a flow diagram of an example method 300 to handle communications between an endpoint device and other devices. For example, the example method 300 may be performed by an intermediate device (e.g., the intermediate device 115 of FIG. 1) to handle communications for and between an endpoint device (e.g., the endpoint devices 105 of FIG. 1) and a relay manager server (e.g., the relay manager server 125 of FIG. 1). In at least some embodiments, the processing logic may include software that is installed on more than one device.

In general, the method 300 may include the intermediate device receiving beacons and determining where to send the beacons. Responsive to identifying a location where to send the beacon, the intermediate device may send the beacon to another device, which may include a server, for example. In some configurations, the intermediate device may use the device ID to identify a server that is related to or associated with the device ID.

The method 300 may begin at block 302, wherein the intermediate device scan for beacons. In some embodiments, the intermediate device may periodically scan for beacons, for example, according to predetermined time intervals. In other embodiments, the intermediate device may continuously scan for beacons.

At block 304, the intermediate device may determine whether a beacon has been found. If a beacon was not found, the method 300 may return to block 302, in which the intermediate device may continue to periodically or continuously scan for beacons. Accordingly, the intermediate device may continue to scan for beacons in response to not finding a beacon.

If a beacon was found, the method 300 may proceed to block 306, in which the intermediate device may forward the beacon. The intermediate device may forward the beacon to an appropriate device, which may be determined by the intermediate device. Accordingly, the intermediate device may forward the beacon to an appropriate device in response to finding a beacon. In some configurations, the intermediate device may forward the beacon to a server, such as the relay manager server 125.

In some embodiments, block 304 may include determining which device to forward the beacon to. For example, the intermediate device may use the device ID included in the beacon to identify a server (e.g., the relay manager servers 125 or the endpoint manager servers 135) that is related to or associated with the device ID. In some circumstances, algorithms or tables may be included on the intermediate device for determining which device the beacon should be forwarded to (e.g., based on device ID or other factors). In at least some embodiments, the processing logic may use a preconfigured list of relay to determine which device to forward the beacon to.

As explained above, the intermediate device may forward beacons from endpoint devices to other devices, such as the relay manager servers 125 or endpoint manager servers 135 of FIG. 1. Those beacons may then be a server, such as the endpoint manager servers 135 of FIG. 1.

FIG. 4 illustrates a flow diagram of another example method 400 to handle communications between an endpoint device and other devices. For example, the example method 400 may be performed by a relay manager server (e.g., the relay manager servers 125 5 of FIG. 1) to handle communications received from endpoint devices (e.g., the endpoint devices 105 of FIG. 1) via intermediate devices (e.g., the intermediate device 115 of FIG. 1). In at least some embodiments, the processing logic may include software that is installed on more than one device, such as the relay manager servers 125.

In general, the method 300 may include searching for a pre-calculated hash value stored in the relay manager server upon receipt of a beacon The method 300 may include validating the beacon as coming from a specific device ID and at a specific time unit (TU) in response to finding a match among the pre-calculated hash values. The method 300 may include forwarding the beacon data to an appropriate device manufacturer's server. The device manufacturer's server may be the endpoint manager servers 135 corresponding to the manufacturer of the endpoint device 105 that transmitted the beacon (e.g., via the intermediate devices 115).

The method 400 may begin at block 402, wherein the relay manager server may receive a beacon from an endpoint device, for example, via the intermediate devices 115 and/or the wireless network 110 of FIG. 1. The beacon may include a hash value which may include various information such as a device ID, time unit when the beacon was generated or transmitted, secret key, etc.

At block 404, the relay manager server may validate the hash value. Validating the hash value may include determining whether the hash value is valid or not. If the hash value is not valid, the method 400 may return to block 402, in which the relay manager server may receive a beacon, which may be different from the beacon initially received. Accordingly, the relay manager server may continue to receive beacons in response to receiving a non-valid beacon until a valid beacon is found.

If the beacon is valid, the method 400 may proceed to block 406, in which the relay manager server may forward the beacon. The relay manager server may forward the beacon to an appropriate device, which may be determined by the relay manager server. Accordingly, the relay manager server may forward the beacon to an appropriate device in response to validating the beacon or the hash value of the beacon being valid. In some configurations, the relay manager server may forward the beacon to the endpoint manager server 135.

As mentioned above, validating the hash value of the beacon may include precomputing hash values for all unique device identities and for all values of time units starting from and up to fixed time values and comparing the hash value received with the beacon with the stored precomputed hash values.

Figure 5:
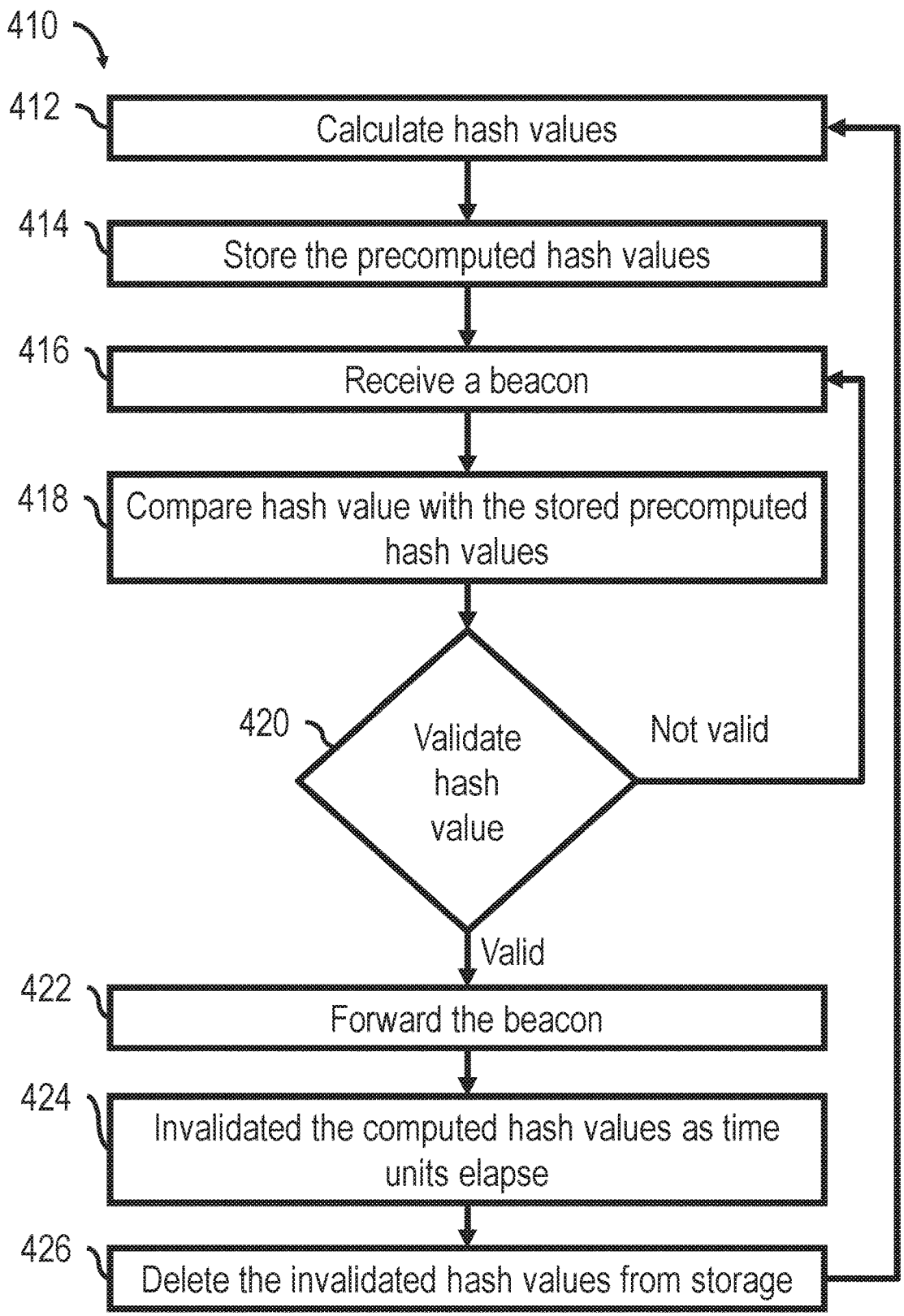
FIG. 5 illustrates a flow diagram of an example method to handle communications between an endpoint device and other devices.

FIG. 5 illustrates a flow diagram of another example method 410 to handle communications between an endpoint device and other devices. For example, the example method 410 may be performed by a relay manager server (e.g., the relay manager servers 125 of FIG. 1) to handle communications received from endpoint devices (e.g., the endpoint devices 105 of FIG. 1) via intermediate devices (e.g., the intermediate device 115 of FIG. 1). In at least some embodiments, the processing logic may include software that is installed on more than one device, such as the relay manager servers 125.

The method 410 may begin at block 412, wherein hash values may be calculated or precomputed. In some aspects, the hash values may be calculated or precomputed for all unique device identities and for all values of time units up to a fixed time value. In some embodiments, the relay manager server may pre-compute a hash value for all unique device IDs and for all values of time units up to some fixed time value (which may be predefined). In some embodiments, the relay manager server may pre-compute a hash value according to the following algorithm: hash(ID, Key, Secret, TU), wherein ID denotes the device ID, Key denotes the secret key, Secret denotes the shared secret and TU denotes the time unit. For each such computed value, the server may add a row to a table which may include the device ID (ID), the time unit (TU), and the hash value (hash(ID, Key, Secret, TU)). As time elapses, the relay manager server may continue to add new hash values hash(ID, Key, Secret, TU) to this table for later TU values. In at least some embodiments, the hash value may be precomputed without using the Secret.

At block 414, the hash values may be stored. For example, the hash values may be stored in memory of a relay manager server (e.g., the relay manager servers 125 of FIG. 1). In at least some embodiments, the server may maintain data in a structure such as a hash table or storing the rows of the table in sorted order according to the hash values (e.g., the third component of the table).

At block 416, a beacon may be received. For example, the beacon may be received by an intermediate device (e.g., one of the intermediate devices 115 of FIG. 1) from an endpoint device (e.g., one of the endpoint devices 105 of FIG. 1) via a first network (e.g., wireless network 110 of FIG. 1). In some aspects, the beacon may include a hash value based at least in part on the identity of the endpoint device and a time unit when the beacon was generated.

At block 418, the hash value received with the beacon may be compared with the stored precomputed hash values. When a beacon is received from a device (e.g., the endpoint device 105), which may be received via an intermediate device (e.g., the intermediate device 115), the relay manager server may check or compare the hash value in the beacon against known hash values, which may be stored in a table. If the relay manager server finds a match, for example, if the hash value in the beacon it receives from the endpoint device is identical or similar to the hash value that occurs in a row in the table, which may be in the form [ID, TU, hash(ID, Key, Secret, TU)], the server then knows the beacon came from the device ID at the specific time (TU).

At block 420, the hash value may be validated. In some aspects, the hash value may be validated by the relay manager server. Validating the hash value may include determining whether the hash value is valid or not. If the hash value is not valid, the method 410 may return to block 416, in which the relay manager server may receive a beacon, which may be different from the beacon initially received. Accordingly, the relay manager server may continue to receive beacons in response to receiving a non-valid beacon until a valid beacon is found. Additionally or alternatively, if the hash value is not valid, the hash value of the beacon may be invalidated in response to the hash value received with the beacon not matching one of the stored computed hash values, and subsequently the method may include continuing to receive additional beacons in response to the hash value of the beacon being invalidated.

If the beacon is valid, the method 410 may proceed to block 422 in which the beacon may be forwarded. In some aspects, the relay manager server may forward the beacon. For example, the beacon may be forwarded to an appropriate device, which may be determined by the relay manager server. Accordingly, the beacon may be forwarded to an appropriate device in response to validating the beacon or the hash value of the beacon being valid. In some configurations, the relay manager server may forward the beacon to the endpoint manager server 135.

In some embodiments, the method 410 may proceed to block 424, in which the computed hash values may be invalidated as time units elapse. The relay manager server may invalidate hashes that have a time stamp or time unit that is earlier than the latest resolved time.

At block 426, the invalidated hashes may be deleted from storage. In some aspects, the relay manager server may invalidate hashes by deleting "old" rows from the table, for example, rows with time unit (TU) values whose difference from the current time is greater than a predetermined threshold value. This invalidates beacons whose time stamps are greater than a predetermined threshold value, and keeps the table from growing unboundedly. In some aspects, the stored computed hash values may be deleted for time unit values whose difference from the current time is greater than a predetermined threshold value, In this way, the relay manager server may keep track of unique IDs of devices whose beacons it has received, and the latest time it received a beacon from the device with a given device ID. Moreover, this is possible while maintaining a very limited number of entries in memory. Rather than maintaining a data structure with hundreds of thousands of hash values, the number of necessary table entries may be reduced to, for example, just 10 or 20 values per device. This permits the system to scale to large numbers of endpoint devices, intermediate devices, and servers.

After the hash values are deleted from the storage, the method 410 may return to block 412, in which new hash values may be calculated. Accordingly, new computed hash values may be calculated as time units elapse.

According to the methods described herein, if either the key or the details of the hash function (and/or the key) are kept secret, it will be highly unlikely that a malicious eavesdropper will be able to impersonate an endpoint device or track it. Even if the hash function is well-known, it is highly unlikely that a malicious eavesdropper could infer the device ID, the key, and the time stamp TU from the hash value hash(ID, Key, Secret TU).

In some embodiments, clock drift may occur, which includes the possibility that the device clock and the server clock may diverge from one another. Accordingly, the disclosed embodiments include configurations to account for potential clock drift for endpoint devices, relay manager servers, or other devices.

Figure 6:
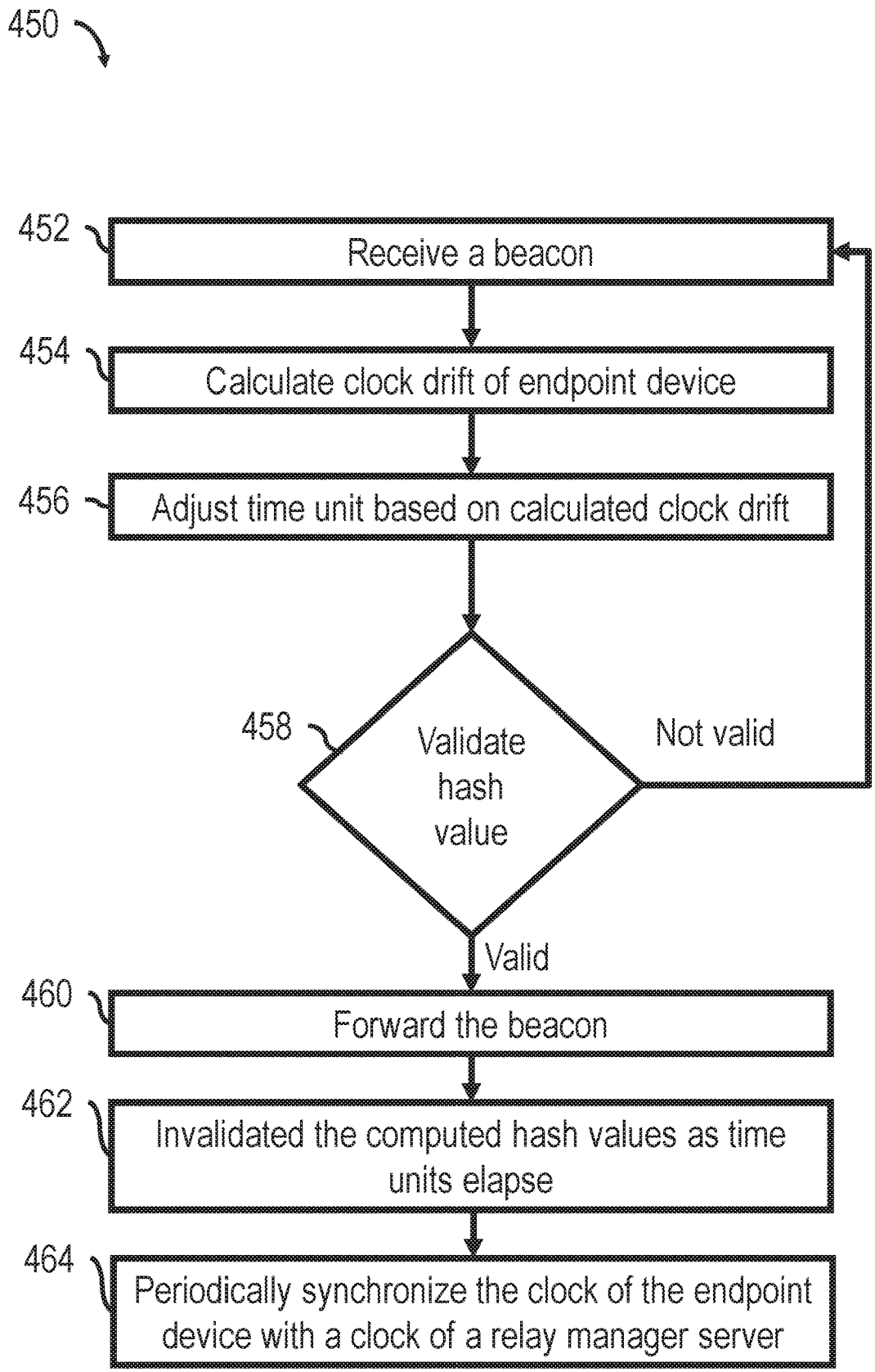
FIG. 6 illustrates a flow diagram of an example method to handle communications between an endpoint device and other devices.

FIG. 6 illustrates a flow diagram of another example method 450 to handle communications between an endpoint device and other devices, and to account for clock drift. For example, the example method 450 may be performed by a relay manager server (e.g., the relay manager servers 125 of FIG. 1) to handle communications received from endpoint devices (e.g., the endpoint devices 105 of FIG. 1) via intermediate devices (e.g., the intermediate device 115 of FIG. 1). In at least some embodiments, the processing logic may include software that is installed on more than one device, such as the relay manager servers 125.

The method 450 may begin at block 452, where a beacon may be received. In some aspects, the beacon may be received by an intermediate device (e.g., one of the intermediate devices 115 of FIG. 1) from an endpoint device (e.g., one of the endpoint devices 105 of FIG. 1) via a first network (e.g., wireless network 110 of FIG. 1). Additionally or alternatively, the beacon may be received by the first intermediate device from an endpoint device via a second network. In some aspects, the beacon may include a hash value based at least in part on the identity of the endpoint device and a time unit when the beacon was generated.

At block 454, a clock drift of the endpoint device may be calculated. In one example, the relay manager server clock may be synchronized with an accurate external clock using NTP (Network Time Protocol). It is possible that the endpoint device clock will drift.

In some circumstances, the device clock may be based on a crystal. The crystal frequency may be temperature dependent. A crystal's frequency characteristic may depend on the shape or "cut" of the crystal. A tuning-fork crystal is usually cut such that its frequency dependence on temperature is quadratic with the maximum around 25° C. This means that a tuning-fork crystal oscillator may resonate close to its target frequency at room temperature, but slows when the temperature either increases or decreases from room temperature.

To account for changes in temperature of the crystal, for example, the following physical properties may be used: Temperature above or below 25 Celsius may reduce the crystal frequency; the Temperature Induced Error (TIE) is approximately equal to $0.04 \times (25-\text{temperature})2$.

In some embodiments, the relay manager server may calculate the clock drift of each endpoint device according to the formula: Clock Drift (CD)=Crystal frequency deviation (in ppm)×time elapsed since last synchronization (in TU). (Here, ppm="parts per million," e.g. 10 ppm indicates a clock drift of 10 microseconds every second).

At block 456, the time unit may be adjusted based on the calculated clock drift. In particular, the time unit may be adjusted based on the number or amount of clock drift calculated in block 454. The time unit may be adjusted and or modified the number or amount of clock drift calculated. The relay manager server may calculate new hash values as time units (TU) elapse. TU elapsed for new hashes may be calculated according to: the actual TU elapsed since last synchronization+clock drift. Block 456 may compensate for clock drift of the endpoint device such that the time unit when the beacon was generated is correct.

At block 458, the hash value may be validated. In some aspects, the hash value may be validated by the relay manager server. Validating the hash value may include determining whether the hash value is valid or not. If the hash value is not valid, the method 450 may return to block 452, in which the relay manager server may receive a beacon, which may be different from the beacon initially received. Accordingly, the relay manager server may continue to receive beacons in response to receiving a non-valid beacon until a valid beacon is found. Additionally or alternatively, if the hash value is not valid, the hash value of the beacon may be invalidated in response to the hash value received with the beacon not matching one of the stored computed hash values, and subsequently the method may include continuing to receive additional beacons in response to the hash value of the beacon being invalidated.

If the beacon is valid, the method 450 may proceed to block 460 in which the beacon may be forwarded. In some aspects, the relay manager server may forward the beacon. For example, the beacon may be forwarded to an appropriate device, which may be determined by the relay manager server. Accordingly, the beacon may be forwarded to an appropriate device in response to validating the beacon or the hash value of the beacon being valid. In some configurations, the relay manager server may forward the beacon to the endpoint manager server 135.

In some embodiments, the method 450 may proceed to block 462, in which the computed hash values may be invalidated as time units elapse. In particular, the relay manager server may invalidate old hashes over time. The number of elapsed TUs necessary to invalidate a hash value may be calculated as: Number of TUs=TU elapsed since last synchronization-CD-TIE for the max temperature range.

In some embodiments, the method 450 may proceed to block 464, in which a clock of the endpoint device may be periodically synchronized with a clock of a relay manager server. Accordingly, the relay manager server and the endpoint device may synchronize periodically.

Figure 7:
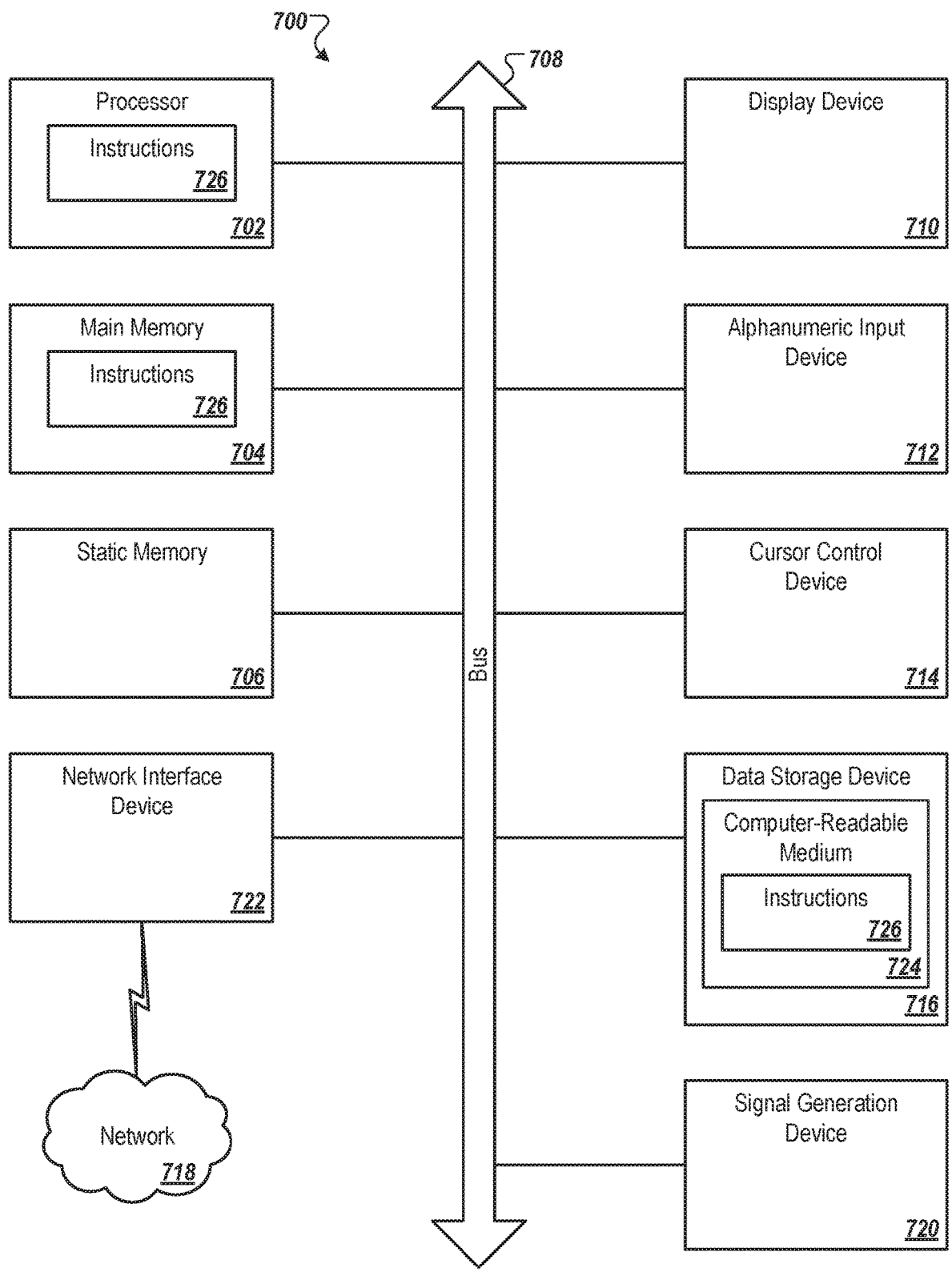
FIG. 7 illustrates a diagrammatic representation of a machine in the example form of a computing device within which a set of instructions, for causing the machine to perform any one or more of the methods discussed herein, may be executed.

FIG. 7 illustrates a diagrammatic representation of a machine in the example form of a computing device 700 within which a set of instructions, for causing the machine to perform any one or more of the methods discussed herein, may be executed. The computing device 700 may include a mobile phone, a smart phone, a netbook computer, a rack-mount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods now abandoned herein.

The example computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 716, which communicate with each other via a bus 708.

Processing device 702 represents one or more general-purpose processing devices such as a microprocessor, central processing unit, or the like. More particularly, the processing device 702 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also include one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computing device 700 may further include a network interface device 722 which may communicate with a network 718. The computing device 700 also may include a display device 710 (e.g., a liquid crystal display (LCD) or a cathode ray tube (CRT)), an alphanumeric input device 712 (e.g., a keyboard), a cursor control device 714 (e.g., a mouse) and a signal generation device 720 (e.g., a speaker). In at least one embodiment, the display device 710, the alphanumeric input device 712, and the cursor control device 714 may be combined into a single component or device (e.g., an LCD touch screen).

The data storage device 716 may include a computer-readable storage medium 724 on which is stored one or more sets of instructions 726 embodying any one or more of the methods or functions described herein. The instructions 726 may also reside, completely or at least partially, within the main memory 704 and/or within the processing device 702 during execution thereof by the computing device 700, the main memory 704 and the processing device 702 also constituting computer-readable media. The instructions may further be transmitted or received over a network 718 via the network interface device 722.

While the computer-readable storage medium 726 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In one non-limiting example, a method may include receiving a beacon from a first intermediate device via a first network. The beacon may be received by the first intermediate device from an endpoint device via a second network. The beacon may include a hash value based at least in part on the identity of the endpoint device and a time unit when the beacon was generated. The method may include validating the hash value of the beacon based on the identity of the endpoint device and the time unit when the beacon was generated. The method may further include forwarding the beacon to a server via a third network in response to the hash value of the beacon being valid.

In some aspects, validating the hash value of the beacon further may include precomputing hash values for all unique device identities and for all values of time units up to a fixed time value, storing the precomputed hash values, comparing the hash value received with the beacon with the stored precomputed hash values, and validating the hash value of the beacon in response to the hash value received with the beacon matching one of the stored precomputed hash values. In other aspects, the stored precomputed hash values may be sorted according to hash values.

The method may include invalidating hash values that have a time unit that is earlier than the latest resolved time. The method may include continuing to receive additional beacons in response to the hash value of the beacon not being valid.

The hash value may be further based on a secret key known to the endpoint device and a relay manager server. The hash value may be further based on a MAC address of the endpoint device.

In some aspects, the time unit may be predetermined before the beacon is generated. The method may include compensating for clock drift of the endpoint device such that the time unit when the beacon was generated is correct. The method may include adjusting a clock of the endpoint device based on temperature variation or crystal inaccuracy.

The hash value of the beacon may prevent the identity of the endpoint device from being discernible by a third party.

In another example, a method may include calculating hash values for all unique device identities and for all values of time units up to a fixed time value, storing the precomputed hash values, receiving a beacon from a first intermediate device via a first network, comparing the hash value received with the beacon with the stored precomputed hash values, validating the hash value of the beacon in response to the hash value received with the beacon matching one of the stored precomputed hash values as a result of the identity of the endpoint device and the time unit when the beacon was generated, and forwarding the beacon to a server via a third network in response to the hash value of the beacon being valid. In some aspects, the beacon may be received by the first intermediate device from an endpoint device via a second network. The beacon may include a hash value based at least in part on the identity of the endpoint device and a time unit when the beacon was generated.

The method may include deleting stored computed hash values for time unit values whose difference from the current time is greater than a predetermined threshold value. The stored computed hash values may be sorted according to hash values. The method may include invalidating the hash value of the beacon in response to the hash value received with the beacon not matching one of the stored computed hash values, and continuing to receive additional beacons in response to the hash value of the beacon being invalidated.

The method may include invalidating the computed hash values as time units elapse, deleting the invalidated hash values from storage; and calculating new computed hash values as time units elapse.

In yet another example, a method may include receiving a beacon from a first intermediate device via a first network, calculating a clock drift of the endpoint device, adjusting the time unit of the based on the calculated clock drift, validating the hash value of the beacon based on the identity of the endpoint device and the time unit when the beacon was generated, and forwarding the beacon to a server via a third network in response to the hash value of the beacon being valid. In some aspects, the beacon may be received by the first intermediate device from an endpoint device via a second network. The beacon may include a hash value based at least in part on the identity of the endpoint device and a time unit when the beacon was generated.

In some aspects, the clock drift may be based on a temperature of a timing crystal of the endpoint device, and the clock drift may be calculated and adjusted based on the temperature of the timing crystal of the endpoint device.

In another aspect, the clock drift may be based on a crystal frequency deviation and an elapsed time since a last clock synchronization, and the clock drift may be calculated and adjusted based on the crystal frequency deviation and the elapsed time since the last clock synchronization.

The method may include periodically synchronizing a clock of the endpoint device with a clock of a relay manager server.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method, comprising:
    receiving a beacon from a first intermediate device via a first network, wherein the beacon was received by the first intermediate device from an endpoint device via a second network, the beacon comprising a hash value, the hash value being generated using the identity of the endpoint device and a time unit when the beacon was generated;
    validating the hash value of the beacon using the identity of the endpoint device and the time unit when the beacon was generated; and
    forwarding the beacon to a server via a third network in response to the hash value of the beacon being valid; and
    invalidating one or more hash values by identifying a respective time unit when the respective one or more hash values were generated.

2. The method of claim 1, wherein validating the hash value of the beacon further comprises:
   precomputing hash values for one or more unique device identities and for values of time units up to a fixed time value;
   storing the precomputed hash values;
   comparing the hash value received with the beacon with the stored precomputed hash values; and
   validating the hash value of the beacon in response to the hash value received with the beacon matching one of the stored precomputed hash values.

3. The method of claim 1, wherein the stored precomputed hash values are sorted according to hash values.

4. The method of claim 1, wherein the hash value is further based on a secret key known to the endpoint device and a relay manager server.

5. The method of claim 1, wherein the hash value is further based on a MAC address of the endpoint device.

6. The method of claim 1, further comprising continuing to receive additional beacons in response to the hash value of the beacon not being valid.

7. The method of claim 1, wherein the time unit is predetermined before the beacon is generated.

8. The method of claim 1, further comprising compensating for clock drift of the endpoint device such that the time unit when the beacon was generated is correct.

9. The method of claim 8, further comprising adjusting a clock of the endpoint device based on temperature variation or crystal inaccuracy.

10. The method of claim 1, wherein the hash value of the beacon prevents the identity of the endpoint device from being discernible by a third party.

11. A method, comprising:
    calculating hash values for a set of unique device identities and for values of time units up to a fixed time value;
    storing the precomputed hash values;
    receiving a beacon from a first intermediate device via a first network, wherein the beacon was received by the first intermediate device from an endpoint device via a second network, the beacon comprising a hash value, the hash value being generated using the identity of the endpoint device and a time unit when the beacon was generated;
    comparing the hash value received with the beacon with the stored precomputed hash values;
    validating the hash value of the beacon in response to the hash value received with the beacon matching one of the stored precomputed hash values as a result of the identity of the endpoint device and the time unit when the beacon was generated;
    deleting stored computed hash values for time unit values whose difference from the current time is greater than a predetermined threshold value; and
    forwarding the beacon to a server via a third network in response to the hash value of the beacon being valid.

12. The method of claim 11, wherein the stored computed hash values are sorted according to hash values.

13. The method of claim 11, further comprising:
    invalidating the hash value of the beacon in response to the hash value received with the beacon not matching one of the stored computed hash values; and
    continuing to receive additional beacons in response to the hash value of the beacon being invalidated.

14. The method of claim 11, further comprising:
    invalidating the computed hash values as time units elapse;
    deleting the invalidated hash values from storage; and
    calculating new computed hash values as time units elapse.

15. A method, comprising:
    receiving a beacon from a first intermediate device via a first network, wherein the beacon was received by the first intermediate device from an endpoint device via a second network, the beacon comprising a hash value, the hash value being generated using the identity of the endpoint device and a time unit when the beacon was generated;
    calculating a clock drift of the endpoint device wherein the clock drift occurs from a temperature of a timing crystal of the endpoint device, and the clock drift is calculated and adjusted based on the temperature of the timing crystal of the endpoint device;
    adjusting the time unit in view of the calculated clock drift;
    validating the hash value of the beacon using the identity of the endpoint device and the time unit when the beacon was generated; and
    forwarding the beacon to a server via a third network in response to the hash value of the beacon being valid.

16. The method of claim 15, further comprising periodically synchronizing a clock of the endpoint device with a clock of a relay manager server.

17. The method of claim 15, further comprising deleting stored computed hash values for time unit values whose difference from the current time is greater than a predetermined threshold value.

18. The method of claim 15, further comprising invalidating one or more hash values that have a time unit that is earlier than a latest resolved time.

19. A method, comprising:
    receiving a beacon from a first intermediate device via a first network, wherein the beacon was received by the first intermediate device from an endpoint device via a second network, the beacon comprising a hash value, the hash value being generated using the identity of the endpoint device and a time unit when the beacon was generated;
    calculating a clock drift of the endpoint device, wherein the clock drift is occurs from crystal frequency deviation and an elapsed time since the last clock synchronization, and the clock drift is calculated and adjusted based on the crystal frequency deviation and the elapsed time since the last clock synchronization;
    adjusting the time unit of the in view the calculated clock drift;
    validating the hash value of the beacon using the identity of the endpoint device and the time unit when the beacon was generated; and
    forwarding the beacon to a server via a third network in response to the hash value of the beacon being valid.

* * * * *